US009211812B2

(12) United States Patent
Haller

(10) Patent No.: US 9,211,812 B2
(45) Date of Patent: Dec. 15, 2015

(54) UTILITY VEHICLE SEAT WITH INTEGRATED ROTATION ADJUSTMENT DEVICE

(71) Applicant: GRAMMER AG, Amberg (DE)

(72) Inventor: Erwin Haller, Birgland (DE)

(73) Assignee: GRAMMER AG, Amberg (DE)

( * ) Notice: Subject to any disclaimer, the term of this patent is extended or adjusted under 35 U.S.C. 154(b) by 50 days.

(21) Appl. No.: 14/109,493

(22) Filed: Dec. 17, 2013

(65) Prior Publication Data

US 2014/0167472 A1 Jun. 19, 2014

(30) Foreign Application Priority Data

Dec. 18, 2012 (DE) ......................... 10 2012 112 527

(51) Int. Cl.

| | |
|---|---|
| ***A47C 1/00*** | (2006.01) |
| ***B60N 2/015*** | (2006.01) |
| ***B60N 2/14*** | (2006.01) |
| ***B60N 2/50*** | (2006.01) |
| ***B60N 2/06*** | (2006.01) |

(52) U.S. Cl.

CPC *B60N 2/015* (2013.01); *B60N 2/06* (2013.01); *B60N 2/062* (2013.01); *B60N 2/14* (2013.01); *B60N 2/508* (2013.01); *B60N 2/509* (2013.01)

(58) Field of Classification Search

CPC ............ B60N 2/06; B60N 2/062; B60N 2/14; B60N 2/143; B60N 2/146; B60N 2/015; B60N 2/508; B60N 2/50

See application file for complete search history.

(56) References Cited

U.S. PATENT DOCUMENTS

| | | | |
|---|---|---|---|
| 2,854,065 | A | 9/1958 | Fox |
| 3,338,622 | A | 8/1967 | Bachmann |
| 3,572,817 | A | 3/1971 | Colautti et al. |
| 3,622,202 | A | 11/1971 | Brown |
| 3,659,895 | A | 5/1972 | Dresden |
| 4,169,625 | A | 10/1979 | Petersen |
| 4,316,631 | A | 2/1982 | Lenz et al. |
| 4,344,597 | A | 8/1982 | Eimen |
| 4,401,287 | A | 8/1983 | Moeser |
| 4,570,997 | A | 2/1986 | Tanizaki et al. |

(Continued)

FOREIGN PATENT DOCUMENTS

| | | |
|---|---|---|
| CA | 2337695 | 8/2001 |
| CN | 202480912 | 10/2012 |

(Continued)

OTHER PUBLICATIONS

U.S. Appl. No. 14/109,117, filed Dec. 17, 2013, Haller.

(Continued)

*Primary Examiner* — Philip Gabler

(74) *Attorney, Agent, or Firm* — Sheridan Ross P.C.

(57) ABSTRACT

The invention relates to a utility vehicle seat with a seat part, with a backrest part and with a seat substructure for arrangement on a bodywork part of a utility vehicle. The seat substructure including a rotation adjustment device having a roller body bearing unit for rotating at least the seat part about a vertical axis, a longitudinal adjustment device and a transverse adjustment device. The rotation adjustment apparatus is arranged between two longitudinal rail units or transverse rail units, in such a way that a vertical extension of the rotation adjustment apparatus amounts to a maximum of 150% or 100% of a vertical extension of the longitudinal rail units or the transverse rail units.

13 Claims, 3 Drawing Sheets

(56) References Cited

U.S. PATENT DOCUMENTS

| | | | |
|---|---|---|---|
| 4,792,188 | A | 12/1988 | Kawashima |
| 4,834,452 | A | 5/1989 | Goodrich |
| 5,042,864 | A | 8/1991 | Mochizuki |
| 5,161,765 | A | 11/1992 | Wilson |
| 5,292,179 | A | 3/1994 | Forget |
| 5,437,494 | A | 8/1995 | Beauvais |
| 5,518,294 | A | 5/1996 | Ligon et al. |
| 5,568,960 | A | 10/1996 | Oleson et al. |
| 5,704,729 | A | 1/1998 | Carnahan et al. |
| 5,720,462 | A | 2/1998 | Brodersen |
| 5,853,221 | A | 12/1998 | Thoman et al. |
| 5,882,076 | A | 3/1999 | Garelick et al. |
| 6,021,989 | A * | 2/2000 | Morita et al. .............. 248/349.1 |
| 6,079,786 | A | 6/2000 | Kirkland et al. |
| 6,158,300 | A | 12/2000 | Klingler |
| 6,164,722 | A | 12/2000 | Mabey |
| 6,325,456 | B1 | 12/2001 | Carnahan |
| 6,402,114 | B1 | 6/2002 | Carnahan et al. |
| 6,557,919 | B2 * | 5/2003 | Suga et al. ................. 296/65.07 |
| 6,575,420 | B2 | 6/2003 | Yoshida et al. |
| 6,722,737 | B2 * | 4/2004 | Kanai ...................... 297/344.22 |
| 6,877,811 | B1 | 4/2005 | Garelick |
| 7,036,883 | B1 * | 5/2006 | Thompson et al. ...... 297/344.24 |
| 7,108,325 | B2 | 9/2006 | Williamson et al. |
| 7,121,608 | B2 | 10/2006 | Billger et al. |
| 7,506,932 | B2 | 3/2009 | Bostrom et al. |
| 7,520,567 | B2 | 4/2009 | Billger et al. |
| 7,845,703 | B2 * | 12/2010 | Panzarella et al. ......... 296/65.11 |
| 7,950,740 | B2 | 5/2011 | Bunea et al. |
| 8,033,589 | B2 | 10/2011 | Kusanagi et al. |
| 9,085,245 | B2 | 7/2015 | Haller |
| 2002/0130528 | A1 | 9/2002 | Mans |
| 2002/0149250 | A1 | 10/2002 | Silvia |
| 2002/0190560 | A1 | 12/2002 | Kohl et al. |
| 2003/0189370 | A1 | 10/2003 | Hemmer et al. |
| 2004/0066074 | A1 | 4/2004 | Ovitt |
| 2004/0188582 | A1 | 9/2004 | Flynn et al. |
| 2004/0232399 | A1 | 11/2004 | Stone |
| 2006/0226685 | A1 | 10/2006 | Priepke et al. |
| 2008/0211284 | A1 | 9/2008 | Mutou et al. |
| 2009/0102271 | A1 | 4/2009 | Squires et al. |
| 2009/0284061 | A1 | 11/2009 | Maier et al. |
| 2010/0001169 | A1 * | 1/2010 | Armo et al. ................... 248/636 |
| 2010/0117413 | A1 | 5/2010 | Squires |
| 2010/0117428 | A1 | 5/2010 | Deml et al. |
| 2011/0074198 | A1 | 3/2011 | Iwasaki et al. |
| 2013/0193729 | A1 | 8/2013 | VanMiddendorp et al. |
| 2014/0167470 | A1 | 6/2014 | Lorey |
| 2015/0015039 | A1 | 1/2015 | Brand et al. |
| 2015/0035334 | A1 | 2/2015 | Roth et al. |

FOREIGN PATENT DOCUMENTS

| | | |
|---|---|---|
| DE | 1116987 | 11/1961 |
| DE | 2828503 | 1/1980 |
| DE | 3127625 | 6/1982 |
| DE | 3218379 | 11/1983 |
| DE | 3708399 | 9/1987 |
| DE | 4415933 | 11/1994 |
| DE | 69202551 | 2/1996 |
| DE | 69721383 | 3/2004 |
| DE | 60118068 | 8/2006 |
| DE | 202006010184 | 9/2006 |
| DE | 102007021141 | 9/2008 |
| DE | 102008058409 | 7/2009 |
| DE | 102010017328 | 12/2011 |
| DE | 1020100053752 | 6/2012 |
| DE | 102011009543 | 8/2012 |
| DE | 102012112525 | 6/2014 |
| EP | 0515275 | 11/1992 |
| EP | 0921962 | 6/1999 |
| EP | 1659021 | 5/2006 |
| EP | 1824358 | 8/2007 |
| EP | 1924462 | 5/2008 |
| EP | 2213504 | 8/2010 |
| EP | 2293959 | 3/2011 |
| FR | 2201659 | 4/1974 |
| GB | 525663 | 9/1940 |
| JP | H06-316233 | 11/1994 |
| JP | H10-217811 | 8/1998 |
| JP | H11-198692 | 7/1999 |
| JP | 2002-211284 | 7/2002 |
| JP | 2002-306267 | 10/2002 |
| JP | 2003-063288 | 3/2003 |
| JP | 2004-203160 | 7/2004 |
| KR | 10-2013-0056092 | 5/2013 |
| WO | WO 2004/056605 | 7/2004 |
| WO | WO 2007/028473 | 3/2007 |
| WO | WO 2010/114966 | 10/2010 |

OTHER PUBLICATIONS

U.S. Appl. No. 14/109,166, filed Dec. 17, 2013, Ott.

U.S. Appl. No. 14/109,425, filed Dec. 17, 2013, Haller.

U.S. Appl. No. 14/109,540, filed Dec. 17, 2013, Haller.

Official Action (no English translation available) for German Patent Application No. 102012112527.9 dated Aug. 12, 2013, 3 pages.

U.S. Appl. No. 14/726,798, filed Jun. 1, 2015, Haller et al.

Extended Search Report for European Patent Application No. 13197034.5, dated Jun. 16, 2015, 3 pages.

* cited by examiner

UTILITY VEHICLE SEAT WITH INTEGRATED ROTATION ADJUSTMENT DEVICE

CROSS-REFERENCE TO RELATED APPLICATIONS

This application claims the benefit of German Application No. 10 2012 112 527.9 filed Dec. 18, 2012, the disclosure of which is incorporated herein by reference.

DESCRIPTION

The invention relates to a utility vehicle seat with a seat part, with a backrest part and with a seat substructure for arrangement on a bodywork part of a utility vehicle, in which the seat substructure comprises a rotation adjustment device comprising a roller body bearing unit for rotating at least the seat part about a vertical axis in rotation adjustment directions, a longitudinal adjustment device with two longitudinal rail units arranged at a distance from each other for adjustment at least of the seat part in longitudinal adjustment directions and a transverse adjustment device with two transverse rail units arranged at a distance from each other for adjustment at least of the seat part in transverse adjustment directions.

Generic vehicle seats are well known from the prior art. In particular, seats of vehicles from the off-road sector, such as for example also utility vehicles, are frequently characterized by a plurality of different seat adjustment modules for example with respect to a longitudinal horizontal suspension, a transverse horizontal suspension and/or a rotation device in order to provide as high a degree of passenger comfort as possible. Seat adjustment modules of this type are usually not a component part of a basic configuration, but can almost always be additionally purchased as optional comfort and/or fitting components. The modular design arising as a result also has the drawback, however, that a seat substructure of a vehicle seat provided with all the aforesaid seat adjustment modules has a very high design with respect to the height of the seat. This has the consequence that vehicle seats fully equipped with these seat adjustment modules are possible only for specific types of vehicles. In most cases of application, however, these fully equipped vehicle seats are too high in design to be able to be installed specifically in smaller vehicles. In addition, even smaller passengers in particular frequently have problems in reaching operating elements of the vehicle conveniently and operating them in a reliable manner. For the reasons set out above, the range of use of vehicle seats fully equipped in this way is extremely limited, so that disadvantageously they cannot be offered at all for specified types of vehicle.

The object of the invention is to overcome at least the drawbacks named above.

The object of the invention is attained by a utility vehicle seat with a seat part, with a backrest part and with a seat substructure for arrangement on a bodywork part of a utility vehicle, in which the seat substructure comprises a rotation adjustment device comprising a roller body bearing unit for rotating at least the seat part about a vertical axis in rotation adjustment directions, a longitudinal adjustment device with two longitudinal rail units arranged at a distance from each other for adjustment at least of the seat part in longitudinal adjustment directions and a transverse adjustment device with two transverse rail units arranged at a distance from each other for adjustment at least of the seat part in transverse adjustment directions, the rotation adjustment apparatus being arranged between the two longitudinal rail units arranged at a distance from each other or the transverse rail units, in such a way that a vertical extension of the rotation adjustment apparatus amounts to a maximum of 150% or 100% of a vertical extension of the longitudinal rail units or the transverse rail units.

As a result of this arrangement according to the invention the necessary structural height for implementing a rotation adjustment device in combination with a longitudinal and/or transverse adjustment device with the same functional scope is reduced by more than 40% as compared with known solutions on the existing utility vehicle seat. As a whole, therefore, a horizontal movement apparatus which preferably combines in itself the rotation adjustment device, the longitudinal adjustment device and the transverse adjustment device can be implemented with a significantly reduced structural height.

In an advantageous manner, either the overall height of the utility vehicle seat can be reduced as a result, or alternatively more structural space is available for an underlying vertical suspension.

The two rail units in each case—situated at a distance from each other—of the present longitudinal and transverse adjustment devices respectively are ideally situated on the same horizontal plane in this case, i.e. are fitted at the same height inside the seat substructure.

In addition, it is advantageous for the roller body bearing unit to be arranged between the two longitudinal rail units arranged at a distance from each other or the two transverse rail units arranged at a distance from each other, in such a way that a vertical extension of the roller body bearing unit amounts to a maximum of 120% or 100% of a vertical extension of the longitudinal rail units or the transverse rail units. As a result, the overall height of the seat can likewise be advantageously reduced.

The present roller body bearing unit is defined in the sense of the invention by at least one roller body rim part, preferably two roller body rim parts, by means of which a rotational movement about the vertical axis is made possible.

With respect to other variants of embodiment, however, the roller body bearing unit can also be supplemented by further components.

Another advantageous variant of embodiment provides that the vertical extension of a structural space provided for the rotation adjustment apparatus or for the roller body bearing unit is limited by a lower imaginary horizontal plane defined by the undersides of the longitudinal rail units arranged at a distance from each other and by an upper imaginary horizontal plane defined by the top sides of the longitudinal rail units arranged at a distance from each other. In this respect the rotation adjustment apparatus in its entirely or at least the roller body bearing unit thereof can be accommodated in the structural space defined by the longitudinal adjustment device, as a result of which a horizontal movement apparatus of the seat substructure can be produced in an extremely low design. In addition, the structural space is bounded physically by the respective rail units.

In an advantageous manner, it is possible in the present case for essential components, in particular the rotation adjustment apparatus, to be integrated in a particularly space-saving manner in a structural space region of the longitudinal adjustment device or the transverse adjustment device, as a result of which the modified space of the existing seat substructure can be utilized substantially more effectively as a whole.

An equally advantageous variant of embodiment as an alternative to this accordingly provides that the vertical extension of a structural space provided for the rotational adjustment apparatus or for the roller body bearing unit is limited by a lower imaginary horizontal plane defined by the undersides of the transverse rail units arranged at a distance from each other and by an upper imaginary horizontal plane defined by the top sides of the transverse rail units arranged at a distance from each other. In this way too, the horizontal movement apparatus of the seat substructure can be produced with an extremely low design.

A horizontal movement apparatus of very compact design as compared with the prior art can be produced if a roller body rim part, preferably two or more roller body rim parts, of the roller body bearing unit is arranged in a structural space between the two longitudinal rail units or transverse rail units arranged at a distance from each other.

In this case the structural space is limited in the sense of the present invention with respect to its height in an imaginary manner by a lower imaginary horizontal plane defined by the undersides of the longitudinal rail units or transverse rail units arranged at a distance from each other and by an upper imaginary horizontal plane defined by the top sides of the longitudinal rail units or transverse rail units arranged at a distance from each other. In addition, the structural space is limited physically at the sides by the respective rail units.

It should be stated at this point that a height of a structural space—defined by the longitudinal rail units or the transverse rail units—between the longitudinal rail units or the transverse rail units amounts to less than 45 mm, preferably less than 40 mm. At present a height of a structural space of 36 mm is achieved.

It is particularly advantageous for a circular roller body track, preferably two or more circular roller body tracks, to be arranged in a structural space between the two longitudinal rail units or transverse rail units arranged at a distance from each other in order to mount roller bodies of the roller body bearing unit. As a result, the necessary structural height of the horizontal movement apparatus can be further reduced.

The structural space between the two longitudinal rail units or transverse rail units arranged at a distance from each other can be utilized in an additionally improved manner if in a cumulative manner a locking device for locking a rotational movement of the rotation adjustment apparatus is arranged radially on the inside of at least one roller body rim part of the roller body bearing unit with respect to the vertical axis. As a result, the locking device can ideally likewise be positioned completely or at least in part between the two longitudinal rail units or transverse rail units arranged at a distance from each other.

With respect to a further preferred variant of embodiment it is proposed that the rotation adjustment apparatus is arranged above the two longitudinal rail units arranged at a distance from each other and between the two transverse rail units arranged at a distance from each other, in which case other arrangements are also possible.

It should also be mentioned that ball members are preferably used as roller bodies, so that a suitable ball bearing unit is involved in the present case. It is also possible, however, for use to be made of other roller bodies.

Further advantages, aims and properties of the present invention are explained with reference to the accompanying drawing and the following description, in which a utility vehicle seat with a rotation adjustment apparatus arranged between two transverse rail units of a transverse adjustment device arranged at a distance from each other is illustrated and described by way of example.

In the drawing

Figure 1:
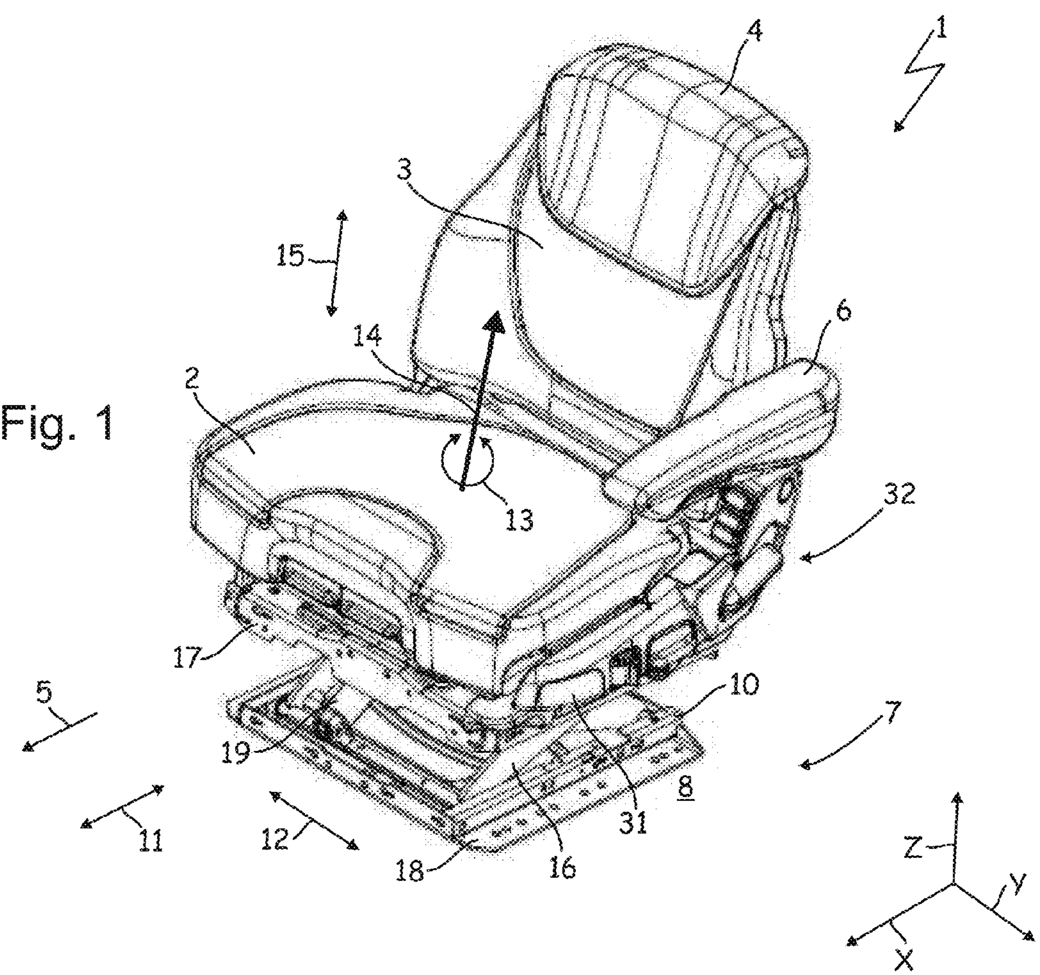
FIG. 1 is a diagrammatic, perspective view of a utility vehicle seat with seat substructure which comprises a horizontal movement apparatus and which has a rotation adjustment device, the ball bearing unit of which is positioned between two transverse rail units of a transverse adjustment device arranged at a distance from each other.

The utility vehicle seat 1 shown in FIG. 1 comprises a seat part 2 for a passenger to sit upon and a backrest part 3 to support the back of the passenger. In this embodiment the backrest part 3 is provided with a head support part 4. In addition, an armrest part 6 is also fastened laterally to the backrest part 3 on the right as viewed in the direction of forward travel 5. Furthermore, the utility vehicle seat 1 also comprises a seat substructure 7, by means of which the utility vehicle seat 1 is fastened in its entirety to a bodywork part 8, such as for example a floor of a utility vehicle cab.

In order to be able to adapt the utility vehicle seat 1 in as many ways as possible to the most widely varying demands of use of the passenger and also to be able to provide an optimum seating comfort, in this embodiment the seat substructure 7 has a horizontal movement apparatus 9 and a vertical movement apparatus 10.

By means of the horizontal movement apparatus 9 at least the seat part 2 and components connected thereto, such as for example the backrest part 3, can be moved in a translational manner in longitudinal adjustment directions 11 (x axis) and in a translational manner in transverse adjustment directions 12 (y axis) as well as in a rotational manner about a vertical axis 14 (z axis) in rotation adjustment directions 13, as is further explained below. On account of its compact design the horizontal movement apparatus 9 has only a very low structural height of 57 mm in this embodiment.

By means of the vertical movement apparatus 10 at least the seat part 2 and components connected thereto, such as likewise the backrest part 3, can be moved in a translational manner with respect to the vertical axis 14 in vertical adjustment directions 15. To this end the vertical movement apparatus 10 comprises a scissors frame 16 which is arranged between a cover plate 17, which carries the horizontal movement apparatus 9, the vertical movement apparatus 10 and a base plate 18 of the vertical movement apparatus 10, in such a way that the horizontal movement apparatus 9 is mounted so as to be movable vertically with respect to the base plate 18. In addition, the vertical movement apparatus 10 also comprises a damper spring device 19 for springing and damping a vertical movement on the utility vehicle seat 1 in the vertical direction 15.

Figure 2:
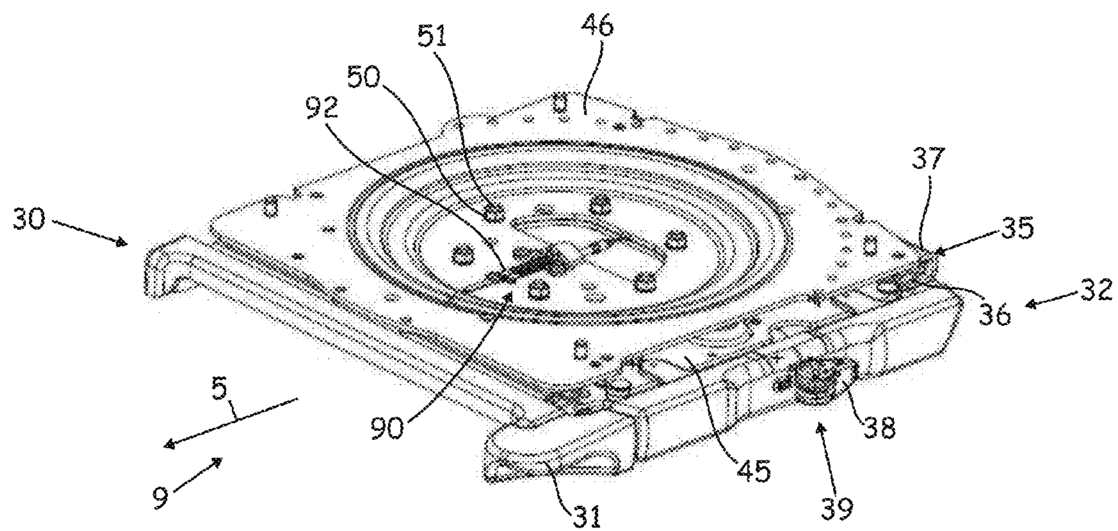
FIG. 2 is a diagrammatic, perspective view of the horizontal movement apparatus of the seat substructure of the utility vehicle seat as shown in FIG. 1.
Figure 3:
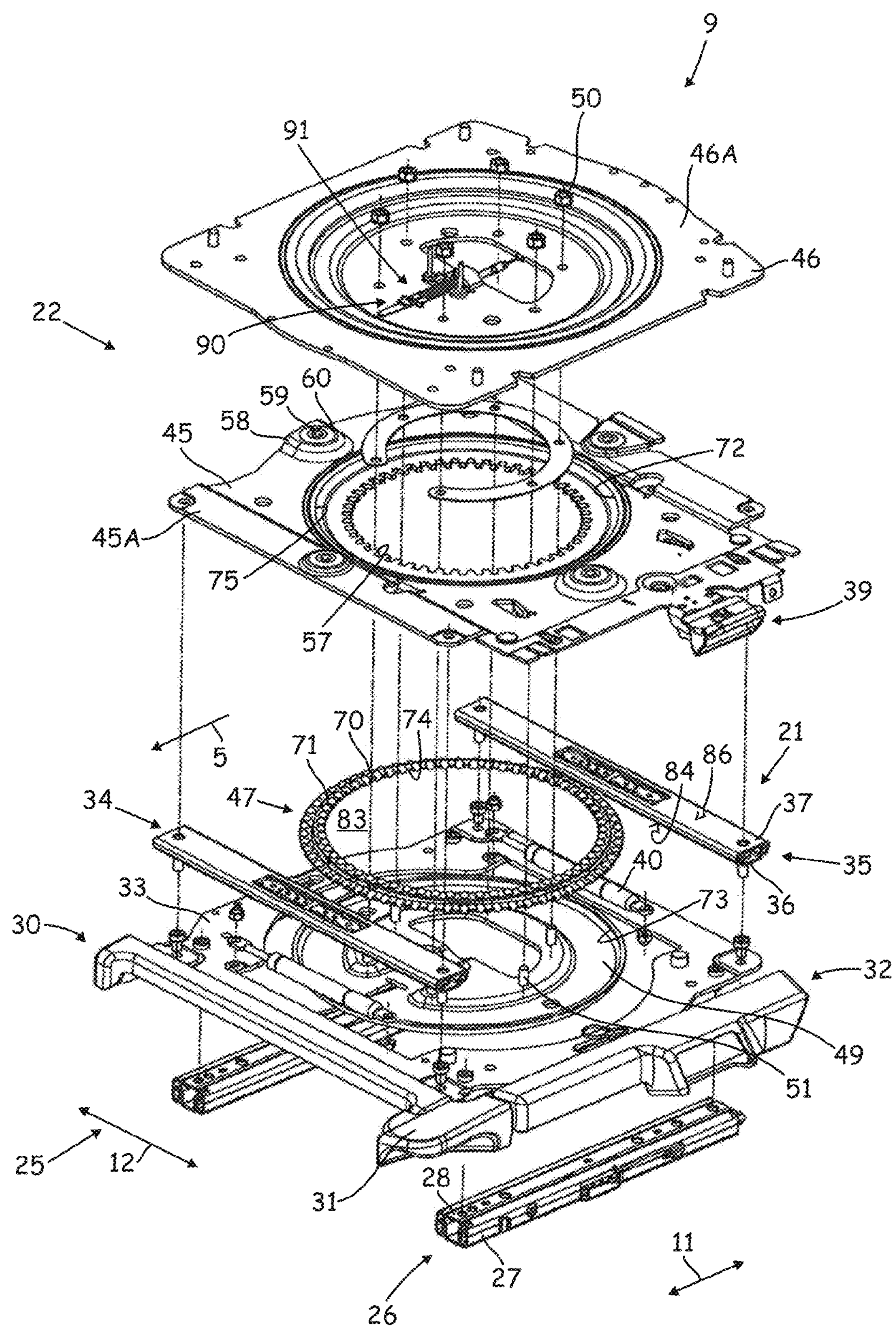
FIG. 3 is a diagrammatic, exploded view of the horizontal movement apparatus as shown in FIGS. 1 and 2.
Figure 4:
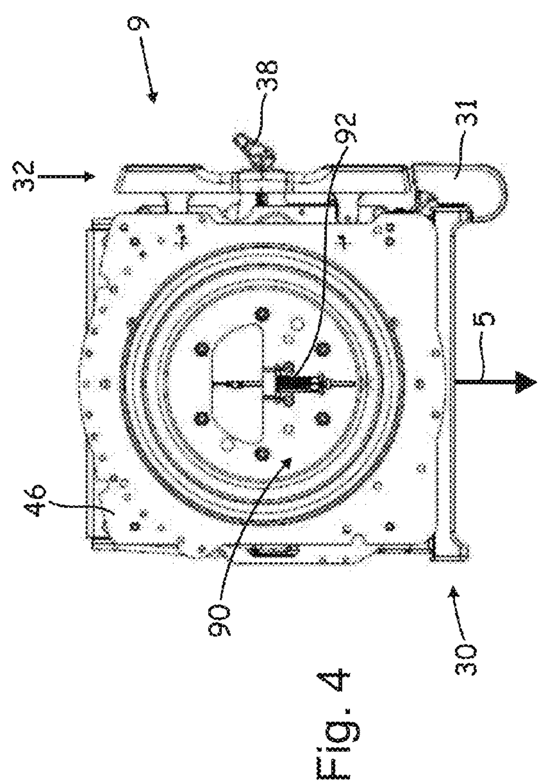
FIG. 4 is a diagrammatic plan view of the horizontal movement apparatus as shown in FIGS. 1 to 3.

The horizontal movement apparatus 9 shown in greater detail in particular in FIGS. 2 and 3 comprises a longitudinal adjustment device 20, a transverse adjustment device 21 and a rotation adjustment device 22, in order to be able to move or set the utility vehicle seat 1 in the sense of the aforesaid longitudinal adjustment directions 11, transverse adjustment directions 12 and rotation adjustment directions 13 respectively. In another, no less advantageous, embodiment the horizontal movement apparatus 9 can also have only one of the adjustment devices 20, 21 and 22 or any other desired combination thereof.

By means of the longitudinal adjustment device 20 a forward longitudinal adjustment path of 120 mm and a rear longitudinal adjustment path of 90 mm with respect to a neutral longitudinal position can be achieved, whereas by means of the transverse adjustment device 21 a transverse adjustment path about a neutral transverse position of +/−25 mm can be achieved. By means of the rotation adjustment device 22 a pivoting movement of 60° about a neutral rotational position and/or an 180° rotation can be achieved about the vertical axis 14 in 7.5° steps in each case.

The longitudinal adjustment device 20 essentially comprises a right-hand longitudinal rail unit 25 and a left-hand longitudinal rail unit 26 (see FIG. 3), each of the longitudinal rail units 25, 26 comprising a guide rail element 27 (numbered only by way of example) and a slide rail element 28 (likewise numbered only by way of example). The guide rail element 27 is screwed in this case onto the cover plate 17 of the vertical movement apparatus 10, and is thus situated above the vertical movement apparatus 10 between the latter and the seat part 2.

In addition, the longitudinal adjustment device 20 in this embodiment also has associated with it a double locking unit 30 by means of which the respective slide rail element 28 is capable of being locked and unlocked respectively on the corresponding guide rail element 27, so that the utility vehicle seat 1 can be fixed or moved in the longitudinal adjustment direction 11.

In order that the double locking unit 30 may be capable of being actuated manually by the passenger, the longitudinal adjustment device 11 also comprises a gripping element 31 which is capable of being actuated manually and which is arranged laterally adjacent to the seat part 2 and integrated in an operating panel 32 of the utility vehicle seat 1.

The slide rail elements 28 of the longitudinal rail units 25 and 26, the double locking unit 30 and also the gripping element 31 capable of being actuated manually together with its mechanism are fastened to a base carrier plate part 33 of the horizontal movement apparatus 9, on which transverse rail units 34 and 35 of the transverse adjustment device 21 are likewise fastened. Each of the transverse rail units 34 and 35 has a guide-rail transverse element 36 and a slide-rail transverse element 37 in order to permit a movement in accordance with the lateral adjustment direction 12.

In addition, in the illustrations in accordance with FIGS. 1 to 3, still further components of the transverse adjustment device 21 are evident, such as for example a lever element 38—capable of being actuated manually (see in particular FIG. 2)—of a locking unit 39 for fixing or releasing the transverse adjustment device 21 as well as damper elements 40 (numbered only by way of example, see FIG. 3) for damping a lateral oscillation when the transverse adjustment device 21 is released.

The respective guide-rail transverse element 36 is screwed to the base carrier plate part 33, whereas the slide-rail transverse element 37 guided in a corresponding manner on the guide-rail transverse element 36 is arranged in each case on a lower shell part 45.

In this embodiment the lower shell part 45 is associated with the rotation adjustment device 22 and with a suitably shaped two-layer upper shell part 46 it forms a mounting for a ball bearing unit 47. On the underside the ball bearing unit 47 is completed and protected by a cover element 49 which forms the second portion of the two-layer upper shell part 46, and with the aid thereof the lower shell part 45, the upper shell part 46 and thus also the ball bearing unit 47 of the rotation adjustment device 22 are clamped. To this end, screw nuts 50 are screwed with corresponding threaded bolts 51 of the cover element 49.

In addition, the lower shell part 45 forms a rotationally fixed stationary shell part 45A of the rotation adjustment device 22, which is integrated in a rotationally fixed manner in the seat substructure 7, whereas the existing two-layer upper shell part 46 accordingly forms a rotating shell part 46A which is rotatable with respect to the stationary shell part 45A and which is mounted so as to be rotatable about the vertical axis 14 on the stationary shell part 45A by two ball rim parts 70 and 71 of the ball bearing unit 47 with the aid of the cover element 49.

In addition, the ball bearing unit 47 is characterized by circular ball tracks 72 and 73 (see FIG. 3) along which the plurality of balls 74 (in this case numbered only by way of example) of the ball rim parts 70 and 71 can roll when the rotating shell part 46A rotates about the vertical axis 14.

In particular, the first circular ball track 72 is formed by a disc-shaped recess 75 pressed into the stationary shell part 45A, in which case the rotating shell part 46A comprises a shaped-out portion complementary thereto. It behaves similarly with respect to the second circular ball track 73 with regard to the cover element 49 (thus not numbered separately).

Figure 5:
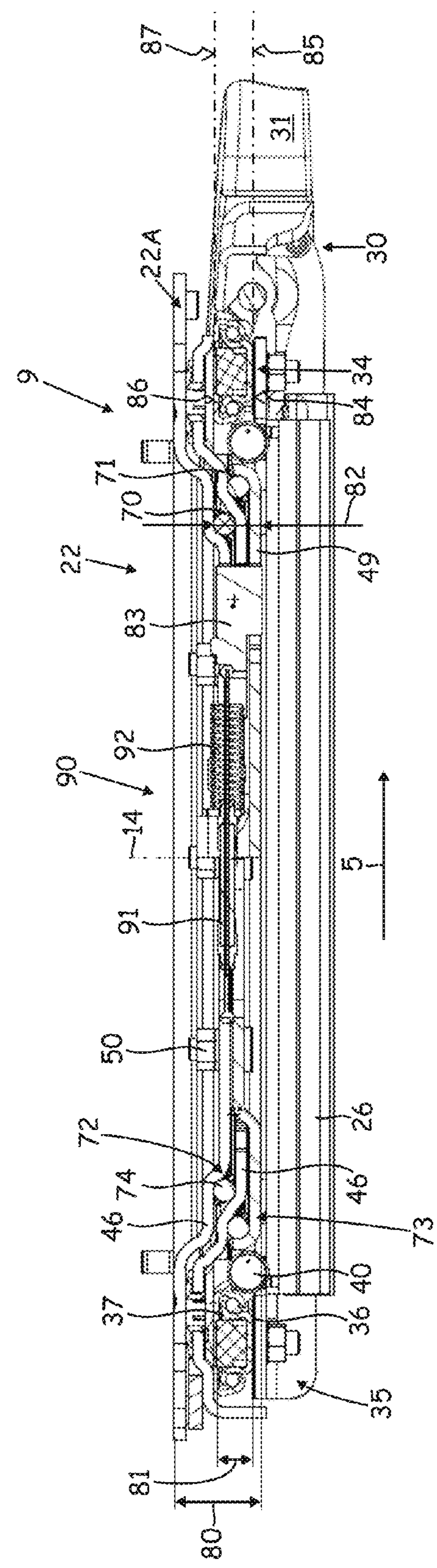
FIG. 5 is a diagrammatic, sectional view of the horizontal movement apparatus as shown in FIGS. 1 to 4 along the section line O-O indicated in FIG. 4.

The transverse adjustment device 21 is situated substantially at a horizontal level of the rotation adjustment device 22, as a result of which the horizontal movement apparatus 9 has an extremely flat design, as is explained still more precisely below, as is easy to see in particular from the illustration in accordance with FIG. 5.

In a specific case this means that the rotation adjustment apparatus 22 is arranged between the two transverse rail units 34, 35 arranged at a distance from each other, in such a way that a vertical extension 80 of the rotation adjustment apparatus 22 amounts to a maximum of 140% of a vertical extension 81 of the transverse rail units 34, 35. In this respect the rotation adjustment apparatus 22 is integrated highly satisfactorily in the transverse adjustment device 21 between the two transverse rail units 34, 35. Only fastening areas 22A of the rotation adjustment apparatus 22 which [are used?] for fastening with further components, such as for example the seat part 2 or the like, project beyond the transverse rail units 34, 35.

In this case, however, the ball bearing unit 47 is arranged between the two transverse rail units 34, 35 arranged at a distance from each other, in such a way that a vertical extension 82 of the ball bearing unit 47 amounts in the present case to 100% of the vertical extension 81 of the transverse rail units 34, 35. In this respect the ball bearing unit 47, which in this embodiment comprises the first ball rim part 70 and the second ball rim part 71, can be integrated completely between the two transverse rail units 34 and 35, and take up no additional structural space in the direction of the z axis (see also FIG. 1).

In addition, the vertical extension 81 of a structural space 83 provided for the ball bearing unit 47 is limited by a lower imaginary horizontal plane 85 (numbered only by way of example) defined by the undersides 84 of the transverse rail units 34 and 35 arranged at a distance from each other and by an upper imaginary horizontal plane 87 (numbered only by way of example) defined by the top sides 86 of the transverse rail units 34, 35 arranged at a distance from each other.

The expression "horizontal plane" is to be understood in the sense of the present invention in such a way that this plane extends in the width direction of the vehicle and in the longitudinal direction of the vehicle and is aligned horizontally only when the utility vehicle is situated on underlying ground aligned horizontally. Otherwise this plane is inclined with the inclination of the utility vehicle as a whole in accordance with the width direction and the longitudinal direction of the vehicle.

It is advantageous for not only the two ball rim parts 70 and 71 of the ball bearing unit 47 but also for the two circular ball tracks 72 and 73 to be accommodated in this structural space 83, in which case the aforesaid circular ball tracks 72 and 73 are arranged extending as far as the upper and lower structural space boundaries which coincide in each case with the upper and lower horizontal plane 85 and 86 respectively. As a result, the present horizontal movement apparatus 9 can be designed to be even lower.

A locking device 90 for locking a rotational movement of the rotation adjustment device 22, in particular with a locking element 91 and with an engagement spring 92 and with the toothed rim in which the locking element 91 is engaged for locking, is advantageously arranged in this structural space 83, so that no further vertical structural space is likewise required on the horizontal movement apparatus 9 for this locking device 90.

In this embodiment the longitudinal adjustment device 20 is arranged below the transverse adjustment device 21, so that the former is positioned between the transverse adjustment device 21 and the vertical movement apparatus 10.

Depending upon whether the utility vehicle seat 1 is a driver's seat or a passenger's seat, the structure, in particular, of the seat substructure 7 can also be designed in a mirror-image manner with respect to the x axis, i.e. the operating panel 32, and in particular the gripping element 31 capable of being actuated manually, can be arranged on the right-hand side of the utility vehicle seat instead of on the left-hand side of the utility vehicle seat.

It is to be understood that the embodiment explained above is only a first design of the utility vehicle seat according to the invention. In this respect the design of the invention is not restricted to this embodiment.

All the features disclosed in the application documents are claimed as being essential to the invention, insofar as they are novel either individually or in combination as compared with the prior art.

LIST OF REFERENCES

1 utility vehicle seat
2 seat part
3 backrest part
4 head support part
5 direction of forward travel
6 armrest part
7 seat substructure
8 bodywork part
9 horizontal movement apparatus
10 vertical movement apparatus
11 longitudinal adjustment directions
12 transverse adjustment directions
13 rotation adjustment directions
14 vertical axis
15 vertical adjustment directions
16 scissors frame
17 cover plate
18 base plate
19 damper spring device
20 longitudinal adjustment device
21 transverse adjustment device
22 rotation adjustment device
22A fastening areas
25 right-hand longitudinal rail unit
26 left-hand longitudinal rail unit
27 guide rail element
28 slide rail element
30 double locking unit
31 gripping element
32 operating panel
33 base carrier plate part
34 front transverse rail unit
35 rear transverse rail unit
36 guide-rail transverse element
37 slide-rail transverse element
38 lifting element
39 locking unit
40 damper elements
45 lower shell part
45A stationary shell part
46 upper shell part
46A rotating shell part
47 roller body bearing unit
49 cover element
50 screw nuts
51 threaded bolt
57 toothed rim
70 first roller body rim part
71 second roller body rim part
72 first circular roller body track
73 second circular roller body track
74 roller bodies
75 disc-shaped recess
80 vertical extension of the rotation adjustment apparatus
81 vertical extension of the transverse rail units
82 vertical extension of the roller body bearing unit
83 structural space
84 undersides
85 lower horizontal plane
86 top sides
87 upper horizontal plane
90 locking device
91 locking element
92 engagement spring

What is claimed is:

1. A utility vehicle seat, comprising:

a seat part, with a backrest part and with a seat substructure for arrangement on a bodywork part of a utility vehicle, in which the seat substructure comprises a rotation adjustment device comprising a roller body bearing unit for rotating at least the seat part about a vertical axis in rotation adjustment directions, a longitudinal adjustment device with two longitudinal rail units arranged at a distance from each other for adjustment at least of the seat part in longitudinal adjustment directions and a transverse adjustment device with two transverse rail units arranged at a distance from each other for adjustment at least of the seat part in transverse adjustment directions, wherein the rotation adjustment device is arranged between the two longitudinal rail units arranged at a distance from each other or the transverse rail units, in such a way that a vertical extension of the rotation adjustment device amounts to a maximum of 150% to 100% of a vertical extension of the longitudinal rail units or the transverse rail units, wherein a vertical extension of a structural space provided for the rotation adjustment device or for the roller body bearing unit is limited by a lower imaginary horizontal plane defined by undersides of the longitudinal rail units arranged at a distance from each other and by an upper imaginary horizontal plane defined by top sides of the longitudinal rail units arranged at a distance from each other.

2. The utility vehicle seat according to claim 1, wherein the roller body bearing unit is arranged between the two longitudinal rail units arranged at a distance from each other or the two transverse rail units arranged at a distance from each other, in such a way that a vertical extension of the roller body bearing unit amounts to a maximum of 120% or 100% of the vertical extension of the longitudinal rail units or the transverse rail units.

3. The utility vehicle seat according to claim 2, wherein the roller body bearing unit is defined by at least one roller body rim part.

4. The utility vehicle seat according to claim 3, wherein the roller body bearing unit is defined by two roller body rim parts.

5. The utility vehicle seat according to claim 1, wherein the vertical extension of the structural space provided for the rotation adjustment device or for the roller body bearing unit is limited by a lower imaginary horizontal plane defined by undersides of the transverse rail units arranged at a distance from each other and by an upper imaginary horizontal plane defined by top sides of the transverse rail units arranged at a distance from each other.

6. The utility vehicle seat according to claim 5, wherein the vertical extension of the structural space provided for the rotational adjustment device between the longitudinal rail units or the transverse rail units amounts to less than 45 mm.

7. The utility vehicle seat according to claim 6, wherein the vertical extension of the structural space provided for the rotational adjustment device amounts to less than 40 mm.

8. The utility vehicle seat according to claim 1, wherein a roller body rim part of the roller body bearing unit is arranged in a structural space between the two longitudinal rail units or transverse rail units arranged at a distance from each other.

9. The utility vehicle seat according to claim 8, wherein two or more roller body rim parts of the roller body bearing unit are arranged in the structural space between the two longitudinal rail units or transverse rail units arranged at a distance from each other.

10. The utility vehicle seat according to claim 1, wherein a circular roller body track is arranged in a structural space between the two longitudinal rail units or transverse rail units arranged at a distance from each other in order to mount roller bodies of the roller body bearing unit.

11. The utility vehicle seat according to claim 10, wherein two or more circular roller body tracks are arranged in the structural space between the two longitudinal rail units or transverse rail units arranged at a distance from each other in order to mount the roller bodies of the roller body bearing unit.

12. The utility vehicle seat according to claim 1, wherein a locking device for locking a rotational movement of the rotation adjustment device is arranged radially on the inside of at least one roller body rim part of the roller body bearing unit with respect to the vertical axis.

13. The utility vehicle seat according to claim 1, wherein the rotation adjustment device is arranged above the two longitudinal rail units arranged at a distance from each other and between the two transverse rail units arranged at a distance from each other.

* * * * *